US009110091B2

(12) United States Patent
Kopper et al.

(10) Patent No.: US 9,110,091 B2
(45) Date of Patent: Aug. 18, 2015

(54) METHOD AND DEVICE FOR DETERMINING THE INSTALLATION POSITION OF A SENSOR MODULE IN A VEHICLE

(75) Inventors: Heiko Kopper, Wunstorf (DE); Arne Michaelsen, Seelze (DE); Tobias Munko, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/363,155

(22) PCT Filed: Sep. 8, 2012

(86) PCT No.: PCT/EP2012/003776
§ 371 (c)(1),
(2), (4) Date: Jun. 5, 2014

(87) PCT Pub. No.: WO2013/091741
PCT Pub. Date: Jun. 27, 2013

(65) Prior Publication Data
US 2014/0330480 A1 Nov. 6, 2014

(30) Foreign Application Priority Data
Dec. 21, 2011 (DE) .......................... 10 2011 121 822

(51) Int. Cl.
*G01M 17/00* (2006.01)
*G01P 21/00* (2006.01)
*B60T 8/88* (2006.01)

(52) U.S. Cl.
CPC ................ *G01P 21/00* (2013.01); *B60T 8/885* (2013.01); *B60T 2201/16* (2013.01); *B60T 2270/406* (2013.01)

(58) Field of Classification Search
CPC ...... G01P 21/00; B60W 40/109; B60T 8/885; B60T 2201/16; B60T 2270/406

USPC .................... 701/29.1, 33.1, 36, 70; 73/1.38; 340/438; 356/5.01
See application file for complete search history.

(56) References Cited

U.S. PATENT DOCUMENTS

| 5,416,703 A * | 5/1995 | Gruler et al. ...................... 701/1 |
| 6,530,597 B1 * | 3/2003 | Nesper et al. ................. 280/735 |
| 8,363,211 B2 * | 1/2013 | Groitzsch et al. ............ 356/5.01 |
| 8,381,570 B2 * | 2/2013 | Ohms et al. ..................... 73/1.38 |
| 2015/0032351 A1 * | 1/2015 | Baum et al. ..................... 701/70 |

FOREIGN PATENT DOCUMENTS

| DE | 195 15 046 A1 | 6/1996 |
| DE | 696 17 268 T2 | 7/1997 |

(Continued)

*Primary Examiner* — Gertrude Arthur Jeanglaude
(74) *Attorney, Agent, or Firm* — Kramer Levin Naftalis & Frankel LLP

(57) ABSTRACT

A method and device are provided for determining the installation position of a sensor module in a vehicle—namely, for determining whether the sensor module has its longitudinal axis oriented longitudinally or transversely. The sensor module has a longitudinal acceleration sensor for measuring a longitudinal module acceleration in the direction of the longitudinal axis and/or a transverse acceleration sensor for measuring a transverse module acceleration transversely with respect to the longitudinal axis. To this end, while the vehicle is travelling, a measured longitudinal module acceleration and/or a measured transverse module acceleration is compared with a longitudinal vehicle acceleration and/or a transverse vehicle acceleration ascertained in another way. By the comparison, at least one degree of conformity is ascertained, which represents the conformity of a measured module acceleration with a calculated vehicle acceleration. The installation position of the sensor module is then determined by means of the degree of conformity.

29 Claims, 2 Drawing Sheets

(56) References Cited

FOREIGN PATENT DOCUMENTS

| DE | 198 44 880 A1 | 4/2000 |
| DE | 198 44 911 A1 | 4/2000 |
| DE | 100 02 471 A1 | 7/2001 |
| DE | 100 02 685 A1 | 7/2001 |
| DE | 102 60 848 A1 | 7/2004 |
| DE | 10 2007 027 556 | 12/2008 |
| EP | 1 578 651 B1 | 9/2005 |

* cited by examiner

METHOD AND DEVICE FOR DETERMINING THE INSTALLATION POSITION OF A SENSOR MODULE IN A VEHICLE

FIELD OF THE INVENTION

The present invention generally relates to a method and device for determining the installation position of a sensor module in a vehicle.

BACKGROUND OF THE INVENTION

DE 100 02 685 A1 and EP 1 578 651 B1 disclose systems by which faulty installation of sensors in a vehicle can be detected. Applicant's DE 100 02 685 A1 is based, for example, on the idea that a yaw angle speed sensor is installed rotated through 180° with respect to the desired angular position, that is, for example, inverted. Incorrect installation of this kind leads to implausible values of the yaw angle speed signal, which is output, and can therefore be detected.

EP 1 578 651 B1 is also based on the idea that sensors are incorrectly installed despite mechanical coding, and is therefore aimed at checking the installation position of a sensor during operation.

SUMMARY OF THE INVENTION

Generally speaking, it is an object of the present invention to improve the determination of the installation position of sensor modules in a vehicle.

A sensor module of a vehicle movement dynamics control system can have sensors, such as acceleration sensors for measuring acceleration in the direction of travel and/or transversely with respect to the direction of travel and, if appropriate, in the vertical direction, as well as a yaw rate sensor and, if appropriate, further sensors such as pitching rate sensors or rolling rate sensors. The sensor module can be embodied either with or without integrated control electronics in addition to the sensors. The sensor module can be functionally connected to further sensors, e.g., via an electrical, optical and/or radio link, such as wheel speed sensors for detecting wheel speed. Furthermore, the sensor module can be functionally connected, e.g., via an electrical, optical and/or radio link, to a steering angle sensor for detecting a steering angle. The control electronics counteract any veering off of the vehicle through selective braking of individual wheels. If the sensor module has only the sensors and no control electronics, the control electronics can be located in a separate module, which can be connected to the sensor module by means of corresponding signal lines or data lines.

The sensor module can be installed, either with or without control electronics, in the vicinity of the center of gravity in a vehicle. Utility vehicles, for example, often have a carrying frame with longitudinal beams and transverse beams, which are provided with a standard hole matrix.

Incorrect installation of the sensor module is not an uncommon problem in utility vehicles with standard hole matrices in transverse beams and longitudinal beams. For instance, if the sensor module is disassembled (e.g., during vehicle maintenance or a repair), there is the risk that the sensor module may not be mounted again at its original, proper installation location. That is, if, for example, the sensor module is provided for mounting on the longitudinal beam, there is the risk that, during maintenance or a repair, the sensor module may be accidentally attached to the transverse beam. Conversely, there is the risk that a sensor module that is provided for mounting on a transverse beam may be attached to the longitudinal beam.

Incorrect mounting on the wrong beam can cause the sensor module to supply sensor signals that do not correspond to actual conditions during vehicle travel. Such faulty sensor signals can cause a vehicle movement dynamics control system to make incorrect interventions, which can, under certain circumstances, bring about dangerous driving states.

In accordance with embodiments of the present invention, a method and a device are provided that can determine whether the sensor module is installed with its longitudinal axis longitudinally or transversely in the vehicle. Therefore, one of a plurality of possible installation states, in particular two installation states, can be detected, which result from the longitudinal beam and transverse beam being interchanged as the installation location.

According to an embodiment of the present invention, the sensor module has a longitudinal acceleration sensor for measuring a module longitudinal acceleration in the direction of the longitudinal axis of the sensor module and/or a transverse acceleration sensor for measuring a module transverse acceleration transversely with respect to the longitudinal axis of the sensor module. The device, which can be the vehicle movement dynamics control system's control electronics, and which can include a suitably programmed processor, an application-specific integrated circuit or the like to effect the inventive method embodiments, includes a comparator, that compares the measured module longitudinal acceleration and/or the measured module transverse acceleration during vehicle travel against a vehicle longitudinal acceleration obtained in another way and/or a vehicle transverse acceleration obtained in another way.

The vehicle longitudinal acceleration can be calculated, for example, from the wheel speeds or using position data of a satellite navigation system or using data of a vehicle-mounted radar system or by means of a second acceleration sensor. The vehicle transverse acceleration can be calculated, for example, from the vehicle speed and the vehicle yaw rate. In this context, the vehicle speed can be calculated, for example, from the wheel speeds or using position data of a satellite navigation system or using data of a vehicle-mounted radar system. Alternatively, the vehicle transverse acceleration can be measured using a further acceleration sensor. According to a further alternative, the vehicle transverse acceleration can be calculated exclusively from the wheel speeds. For this purpose, the wheel speeds of one or more wheels on the inside of a bend in the roadway and one or more wheels on the outside of the bend are taken into account. These wheel speeds provide definitive information about the radius of a bend and the vehicle speed, from which the transverse acceleration can be obtained.

On the basis of the comparison by the comparator, at least one degree of correspondence, which represents the correspondence of a measured module acceleration and of a calculated vehicle acceleration, can be obtained. The installation position of the sensor module can be determined on the basis of the degree of correspondence, i.e., whether the sensor module is installed with its longitudinal axis longitudinally with respect to the longitudinal axis of the vehicle or transversely with respect to the longitudinal axis of the vehicle.

It should be appreciated that a simple installation error can be readily detected without the need for complicated additional devices not otherwise installed in a modern vehicle. In addition, a vehicle movement dynamics control system can be protected against incorrect installation of its sensor module, in particular against a provided transverse installation and longitudinal installation being interchanged.

According to another embodiment, during non-accelerated cornering, the degree of correspondence between the module longitudinal acceleration, which is measured at this time, and the vehicle transverse acceleration, which is calculated at this time, is obtained, and, if the degree of correspondence exceeds a predetermined threshold, the installation position of the sensor module is determined such that its longitudinal axis is oriented transversely with respect to the vehicle. In this case, it is, in fact, clear that the installation position is not correct. In this case, for example, the signals of individual sensors can be interchanged in order to carry out the vehicle movement dynamics control process again with correct signals. However, if appropriate, the sensor values can be numerically converted so that the vehicle movement dynamics control system is supplied with correct values. However, if this is not possible, an error signal is advantageously output in order to signal the installation error.

If the degree of correspondence specified above undershoots a predetermined threshold, the installation position of the sensor module is determined such that its longitudinal axis is oriented longitudinally with respect to the vehicle. In this case, the orientation of the longitudinal axis of the sensor module corresponds to the longitudinal axis of the vehicle. It can then be assumed that the installation position is correct and no installation error has occurred. In such a case, the sensor signals are fed to the vehicle movement dynamics control system.

In a further embodiment, during non-accelerated cornering, the degree of correspondence between the module transverse acceleration, which is measured at this time, and the vehicle transverse acceleration, which is calculated then, is obtained. If the degree of correspondence exceeds a predetermined threshold, the installation position of the sensor module is determined such that its longitudinal axis is oriented longitudinally with respect to the vehicle. However, if the degree of correspondence undershoots a predetermined threshold, the installation position of the sensor module is determined such that its longitudinal axis is oriented transversely with respect to the vehicle. In this embodiment, the measured module transverse acceleration and the calculated vehicle transverse acceleration are therefore combined with one another to provide definitive information about the installation position of the sensor module.

According to a still further embodiment, during accelerated straight-ahead travel, the degree of correspondence between the module transverse acceleration, which is measured then, and the vehicle longitudinal acceleration, which is calculated then, is obtained. If the degree of correspondence exceeds a predetermined threshold, the installation position of the sensor module is determined such that its longitudinal axis is oriented transversely with respect to the vehicle. However, if the degree of correspondence undershoots a predetermined threshold, the installation position of the sensor module is determined such that its longitudinal axis is oriented longitudinally with respect to the vehicle. In this embodiment, the measured vehicle transverse acceleration is combined with the calculated module longitudinal acceleration to provide definitive information about the installation direction of the sensor module.

In yet another embodiment, during accelerated straight-ahead travel, the degree of correspondence between the module longitudinal acceleration, which is measured then, and the vehicle longitudinal acceleration, which is calculated then, is obtained. If the degree of correspondence exceeds a predetermined threshold, the installation position of the sensor module is determined such that its longitudinal axis is oriented longitudinally with respect to the vehicle. If the degree of correspondence undershoots a predetermined threshold, the installation position of the sensor module is determined such that its longitudinal axis is oriented transversely with respect to the vehicle. In this embodiment, the measured module longitudinal acceleration is therefore combined with the calculated vehicle longitudinal acceleration to provide definitive information about the orientation of the installation of the sensor module.

Thus, it should be understood that the sensor signals that indicate a module longitudinal acceleration or a module transverse acceleration can be compared during vehicle travel with a vehicle longitudinal acceleration, calculated for example from the wheel speeds, and with a vehicle transverse acceleration, calculated for example from the vehicle speed and the yaw rate of the vehicle. If during non-accelerated cornering, the measured module longitudinal acceleration fits satisfactorily with the alternatively obtained vehicle transverse acceleration, i.e., for example, the calculated vehicle transverse acceleration, such that there is a high degree of correspondence between the measured module longitudinal acceleration and the calculated vehicle transverse acceleration, the installation position of the sensor module is likely not correct, i.e., it is likely that the sensor module has been installed on the transverse beam instead of on the longitudinal beam or on the longitudinal beam instead of on the transverse beam.

If, during accelerated straight-ahead travel, the measured module transverse acceleration fits satisfactorily with the alternatively obtained, i.e., for example, calculated, vehicle longitudinal acceleration, it is also likely that the installation position is not correct, i.e., that the sensor module has been mounted on the transverse beam instead of on the longitudinal beam, or vice-versa.

Also, the measured module longitudinal acceleration can be combined with the calculated vehicle longitudinal acceleration and the degree of correspondence thereof can be examined. If these accelerations correspond essentially, it is likely that the sensor module is correctly installed. On the other hand, if they do not approximately correspond, it is likely that the sensor module has been installed incorrectly.

Furthermore, during non-accelerated cornering, the module transverse acceleration and the vehicle transverse acceleration can be compared. If these accelerations correspond essentially, it is likely that the sensor module is correctly installed. However, if they do not correspond, it is likely that the sensor module has been incorrectly installed.

According to a further embodiment, non-accelerated cornering is detected if the calculated vehicle longitudinal acceleration is zero or below a lower longitudinal acceleration threshold value and the calculated vehicle transverse acceleration is above an upper transverse acceleration threshold value. On the other hand, accelerated straight-ahead travel is detected if the calculated vehicle longitudinal acceleration is above an upper longitudinal acceleration threshold value and the calculated vehicle transverse acceleration is zero or below a lower transverse acceleration threshold value.

These upper threshold values permit unambiguous determination of the type of movement, i.e., whether non-accelerated cornering or accelerated straight-ahead travel is occurring. The lower threshold values permit measuring inaccuracies to be tolerated and, at the same time, the detection of the correct type of movement, i.e., non-accelerated cornering or accelerated straight-ahead travel.

According to a further embodiment, the installation position is compared with a setpoint installation position and, when there is a discrepancy between these two installation positions, an error signal is generated. The error signal can be output as an acoustic and/or visual and/or haptic warning signal to warn the vehicle driver that sensors of the vehicle or of the vehicle movement dynamics control system will not operate correctly. The driver can then, for example, deactivate the functions of the vehicle movement dynamics control system manually. Additionally or alternatively, the deactivation can, also be carried out directly by means of the error signal in order to avoid malfunctions of the vehicle movement dynamics control system.

According to a still further embodiment, the installation position is determined in an initialization mode of the sensor module and is permanently stored in the sensor module, the device for determining the installation position of the sensor module and/or in the vehicle. In this way, automatic detection of the installation position of a sensor module in the vehicle can already advantageously take place in the production works of the vehicle. As a result, parameterization becomes superfluous. Instead, the sensor module, the device for determining the installation position of the sensor module or the vehicle itself "learns" the installation position of the sensor module as long as the sensor module, the device or the vehicle is in the as-delivered state or initialization mode. The installation position is then automatically detected and stored for use during further operation of the vehicle.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is discussed in greater detail below with reference to the accompanying drawings, in which.

Figure 1:
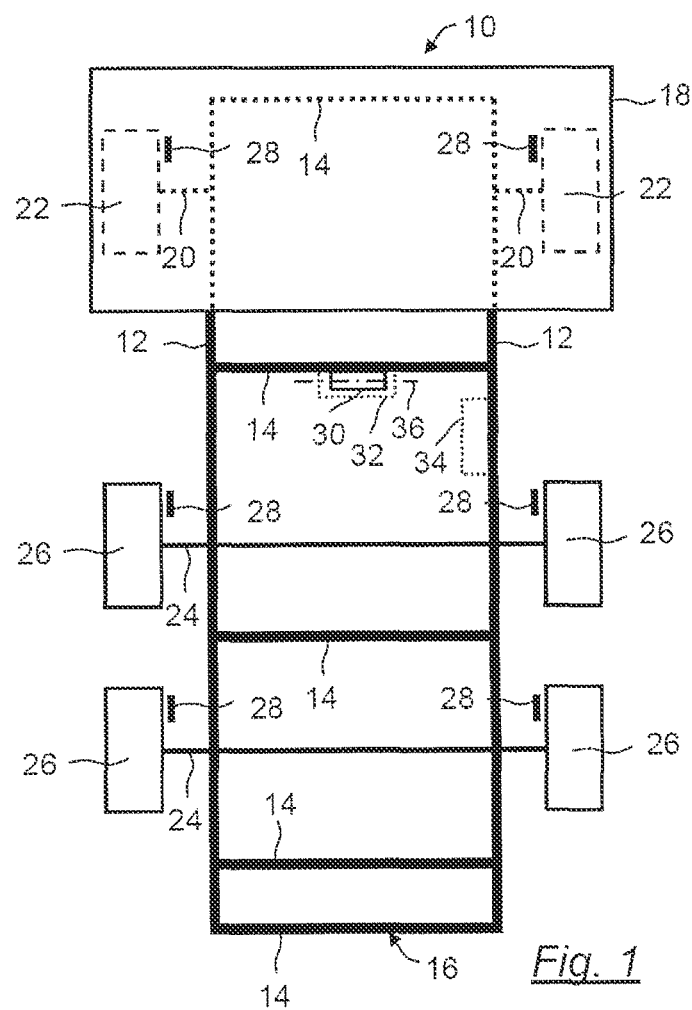
FIG. 1 is a simplified schematic plan view of a vehicle, illustrating possible installation positions of a sensor module, according to an embodiment of the present invention.

LIST OF REFERENCE CHARACTERS 10 vehicle
12 longitudinal beam
14 transverse beam
16 frame
18 driver's cab
20 axles of the front wheels
22 front wheels
24 rear axles
26 rear wheels
28 rotational speed sensor
30 sensor module
32 position on the transverse beam
34 position on the longitudinal beam
36 longitudinal axis of the sensor module
38 step for detecting accelerated straight-ahead travel
40 step for detecting a correct installation position
42 step for detecting an incorrect installation position
44 signal for correct installation
46 signal for incorrect installation
48 step for detecting non-accelerated cornering
50 step for detecting a correct installation position
52 step for detecting an incorrect installation position
54 signal for correct installation
56 signal for incorrect installation

DETAILED DESCRIPTION OF THE PREFERRED EMBODIMENTS

FIG. 1 is a simplified schematic plan view of a vehicle 10, which is preferably a utility vehicle, and, in the exemplary embodiment, a tractive unit. Vehicle 10 has a plurality of longitudinal beams 12 and a plurality of transverse beams 14, which together form a frame 16. The frame 16 supports vehicle body structures, in particular the driver's cab 18. In addition, the axles 20 of the front wheels 22 and one or more rear axles 24 with rear wheels 26 are also arranged at least indirectly.

The vehicle 10 has a vehicle movement dynamics control system. This is a driving assistance system that, through selective braking of individual front wheels 22 or rear wheels 26, counteracts any veering off of the vehicle 10. Through selective braking of individual wheels of these wheels 22, 26, the vehicle movement dynamics control system attempts to prevent the vehicle 10 from skidding. For this purpose, a steering angle sensor is provided that detects a steering angle request of the driver with respect to the desired direction of travel. In addition, the vehicle 10 has rotational speed sensors 28 on the wheels 22, 26, which detect the rotational speeds of the individual wheels 22, 26.

In addition, a speed of the vehicle 10 can be obtained by using the rotational speed sensors.

A sensor module 30 is advantageously installed on the frame 16, either on one of the transverse beams 14 or on one of the longitudinal beams 12. According to FIG. 1, the sensor module 30 is installed at a position 32 on a transverse beam 14. However, it can also be installed at a position 34 on a longitudinal beam. A reason for this may be that both the longitudinal beams 12 and the transverse beams 14 have a (standard) hole matrix with respectively identical distances between the holes into which the sensor module 30 can be screwed. The sensor module can, however, also be installed on brackets, which also permit different installation positions.

The sensor module 30 can therefore be installed with its longitudinal axis 36 transversely in the vehicle, as would be the case with position 32. The sensor module 30 can, however, also be installed longitudinally in the vehicle, as is represented by position 34. This orientation does not lend itself to being interchanged randomly since the sensor module has at least one yaw rate sensor and one transverse acceleration sensor for measuring a module transverse acceleration transversely with respect to the longitudinal axis 36 of the sensor module 30 and a longitudinal acceleration sensor for measuring a module longitudinal acceleration in the direction of the longitudinal axis 36 of the sensor module 30. If the longitudinal axis 36 of the sensor module 30 is oriented in the longitudinal direction of the vehicle 10, the longitudinal acceleration sensor measures a longitudinal acceleration of the vehicle 10, and the transverse acceleration sensor measures a transverse acceleration of the vehicle 10. However, if the sensor module 30 is installed, for example, at the position 34 on a longitudinal beam 12, the longitudinal acceleration sensor measures a transverse acceleration of the vehicle 10 and the transverse acceleration sensor measures a longitudinal acceleration of the vehicle 10.

The sensor module 30 can also have a further acceleration sensor for measuring a vertical acceleration of the sensor module. This, however, can be dispensed with for standard configurations of vehicle movement dynamics control systems.

In addition, the sensor module 30 has a yaw rate sensor. The sensor module 30 can also have a rolling rate sensor and/or a pitching rate sensor.

Interchanging installation positions 32, 34 can also cause incorrect values to be supplied by the rolling rate sensor and the pitching rate sensor.

To determine the installation position of the sensor module 30, the values measured by the sensors within the sensor module 30 are therefore compared with comparable variables, which are detected partially or completely outside the sensor module 30. The vehicle longitudinal acceleration $L_{wheel}$ is calculated, for example, from the wheel speeds detected by the rotational speed sensors 28. However, they can additionally or alternatively be calculated by means of position data of a satellite navigation system or by means of data of a vehicle-mounted radar system or measured by means of another acceleration sensor. The transverse acceleration of the vehicle 10 is calculated from the vehicle speed and the yaw rate. The yaw rate is obtained either with the yaw rate sensor of the sensor module 30 or with another yaw rate sensor. Since, with an installation position according to position 32 and with an installation position according to position 34, both will obtain a yaw rate of the vehicle that is essentially the same in both cases, this yaw rate can also be used to calculate the vehicle transverse acceleration $T_{yaw}$. Additionally or alternatively, the vehicle transverse acceleration can be measured by means of a further acceleration sensor and/or calculated from the wheel speeds.

In this way, a module longitudinal acceleration $L_{sens}$ is measured by means of the sensor module 30. In addition, in this way, a module transverse acceleration $T_{sens}$ is measured by means of the sensor module 30.

Also, the calculated or measured vehicle longitudinal acceleration $L_{wheel}$ and the calculated or measured vehicle transverse acceleration $T_{yaw}$ are obtained.

Figure 2:
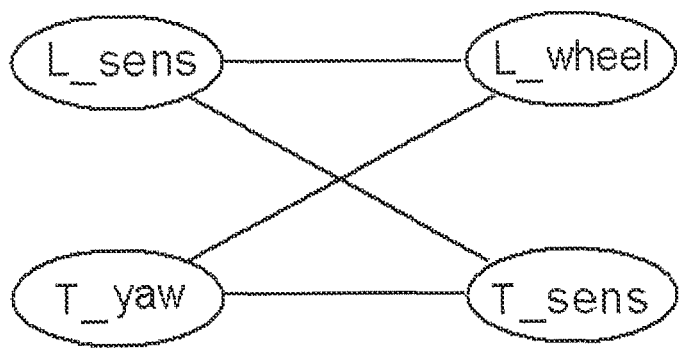
FIG. 2 shows the possibilities for combining the measured module longitudinal accelerations and transverse accelerations and the calculated vehicle longitudinal accelerations and transverse accelerations according to embodiments of the present invention.

FIG. 2 illustrates schematically how these measured variables of the module longitudinal acceleration $L_{sens}$, and module transverse acceleration $T_{sens}$ can be combined with the calculated or measured variables of the vehicle longitudinal acceleration $L_{wheel}$ or vehicle transverse acceleration $T_{yaw}$ in order to detect the installation position of the sensor module 30. Overall, four possibilities of combining the measured accelerations with the calculated accelerations are obtained.

Firstly, in the case of non-accelerated cornering, the measured module longitudinal acceleration $L_{sens}$ can be compared with the calculated or measured vehicle transverse acceleration $T_{yaw}$. If the measured module longitudinal acceleration $L_{sens}$ corresponds essentially to the calculated or measured vehicle transverse acceleration $T_{yaw}$, it is possible to infer therefrom that the longitudinal axis 36 of the control module 30 is oriented transversely with respect to the vehicle longitudinal axis. Since the acceleration values obtained will not correspond precisely, a degree of correspondence of the acceleration values is detected. If this degree of correspondence exceeds a predetermined threshold, the installation position of the sensor module 30 is detected such that the longitudinal axis 36 of the control module 30 is oriented transversely with respect to the vehicle 10. This comparison is carried out in the case of non-accelerated cornering.

On the other hand, if a degree of correspondence for the correspondence of the measured module longitudinal acceleration $L_{sens}$ and of the calculated or measured vehicle transverse acceleration $T_{yaw}$ undershoots a predetermined threshold, it is determined that the longitudinal axis 36 of the sensor module 30 is oriented longitudinally with respect to the vehicle.

In addition, in the case of non-accelerated cornering, the measured module transverse acceleration $T_{sens}$ can be compared with the calculated or measured vehicle transverse acceleration $T_{yaw}$ and the degree of correspondence of these two acceleration values can be detected. If the degree of correspondence exceeds a predetermined threshold, the installation position of the sensor module 30 is detected such that its longitudinal axis 36 is oriented longitudinally with respect to the vehicle 10. On the other hand, if the degree of correspondence undershoots a predetermined threshold, the installation position of the sensor module 30 is detected such that its longitudinal axis 36 is oriented transversely with respect to the vehicle.

During accelerated straight-ahead travel, the measured module transverse acceleration $T_{sens}$ can be compared with the calculated or measured vehicle longitudinal acceleration $L_{wheel}$. If these acceleration values correspond essentially, i.e., the degree of correspondence between these acceleration values exceeds a predetermined threshold, the longitudinal axis 36 of the sensor module 30 is detected as oriented transversely with respect to the vehicle 10. However, if the degree of correspondence undershoots a predetermined threshold, the installation position of the sensor module 30 is detected as being such that the longitudinal axis 36 of the sensor module is oriented longitudinally with respect to the vehicle 10.

In addition, during accelerated straight-ahead travel, the measured module longitudinal acceleration $L_{sens}$ can be compared with the calculated or measured vehicle longitudinal acceleration $L_{wheel}$. If these acceleration values correspond essentially, i.e., if the degree of correspondence between these acceleration values exceeds a predetermined threshold, the longitudinal axis 36 of the sensor module 30 is detected as oriented longitudinally with respect to the vehicle 10. However, if the degree of correspondence undershoots a predetermined threshold, the installation position of the sensor module 30 is detected as being such that the longitudinal axis 36 of the sensor module 30 is oriented transversely with respect to the vehicle 10.

The differentiation between non-accelerated cornering or accelerated straight-ahead travel can be obtained from the yaw rate and the wheel speeds. In this context, threshold values, which have to be exceeded for a calculated or measured vehicle longitudinal acceleration $L_{wheel}$ or a calculated or measured vehicle transverse acceleration $T_{yaw}$ to be considered significant, are detected.

Figure 3:
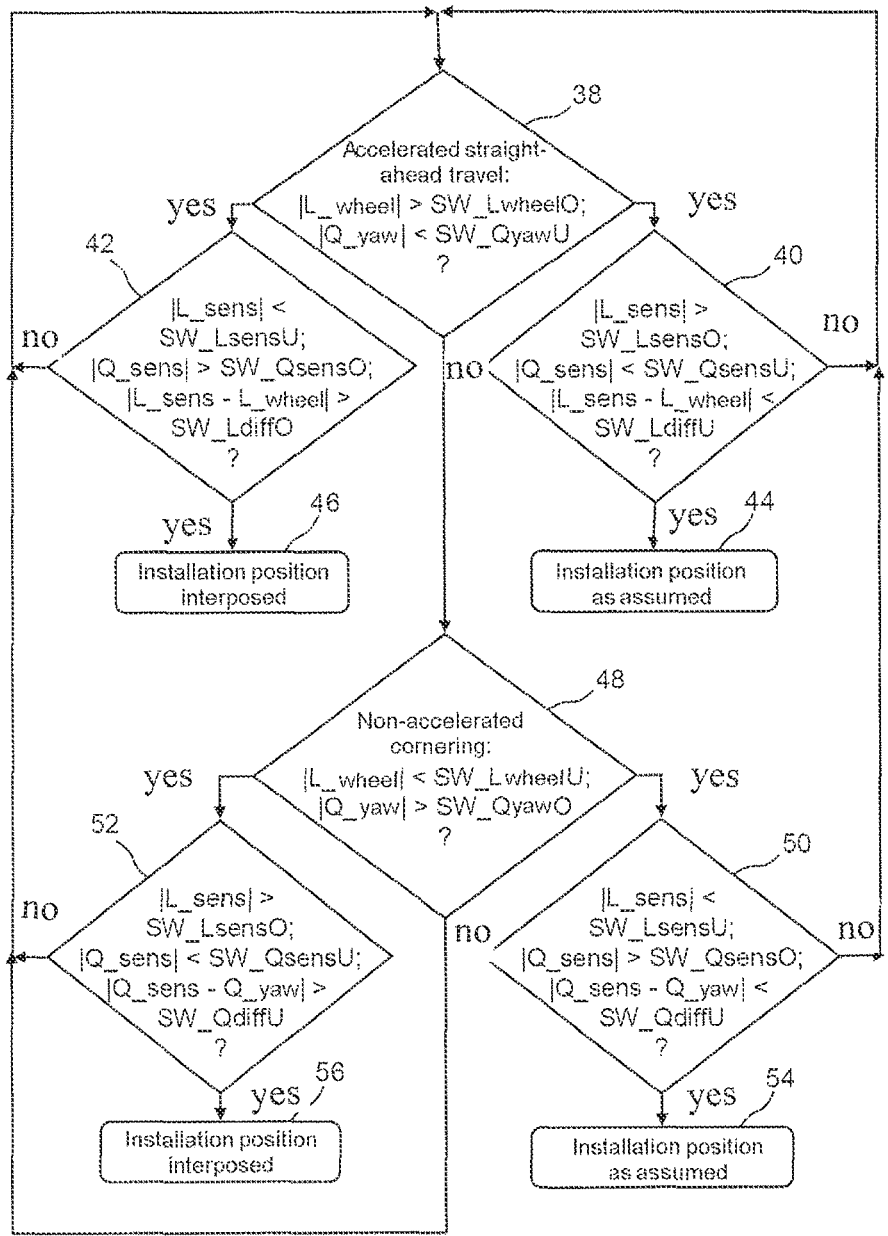
FIG. 3 is a flowchart illustrating an exemplary embodiment according to the invention.

FIG. 3 is a flowchart illustrating a method for determining the installation position of a sensor module in a vehicle according to an embodiment of the present invention. In step 38, a determination is made as to whether accelerated straight-ahead travel is occurring. For this purpose, a check is made as to whether the absolute value of the calculated or measured vehicle longitudinal acceleration $L_{wheel}$ is higher than an upper longitudinal acceleration threshold value $SWL_{wheel}O$ and, at the same time, whether the absolute value of the calculated or measured vehicle transverse acceleration $T_{yaw}$ is smaller than a lower transverse acceleration threshold value $SWT_{yaw}U$ or is equal to zero. If these two conditions are met, the process moves to step 40 where a determination is made as to whether the sensor module 30 is installed as assumed. For this purpose, a check is made as to whether the absolute value of the measured module longitudinal acceleration $L_{sens}$ is larger than an upper longitudinal acceleration threshold value $SWL_{sens}O$. In addition, a determination is made as to whether the absolute value of the measured module transverse acceleration $T_{sens}$ is smaller than a lower transverse acceleration threshold value. Finally, a degree of correspondence between the measured module longitudinal acceleration $L_{sens}$ with the calculated or measured vehicle longitudinal acceleration $L_{wheel}$ is obtained by forming differences between these two variables and forming the absolute value. If the difference between the two variables is small in absolute value, the degree of correspondence is large. This is detected because the difference is below a lower longitudinal acceleration difference threshold value $SWL_{diff}U$.

If each of the interrogations in step 38 is answerable in the affirmative, the sensor module 30 is correctly installed and the longitudinal axis 36 of the sensor module 30 is oriented longitudinally with respect to the vehicle 10.

If all the interrogations in step 38 can be answered in the affirmative, and therefore accelerated straight-ahead travel is detected, the process moves to step 42 where a determination is made as to whether the installation position corresponds to the assumed installation position. This includes determining whether the absolute value of the measured module longitudinal acceleration $L_{sens}$ is smaller than a lower longitudinal acceleration threshold value $SWL_{sens}U$ and whether the absolute value of the measured module transverse acceleration $T_{sens}$ is larger than an upper transverse acceleration threshold value $SWT_{sens}O$. In addition, the degree of correspondence between the measured module longitudinal acceleration $L_{sens}$ and the calculated or measured vehicle longitudinal acceleration $L_{wheel}$ is obtained. For this purpose, the difference in absolute value between the two longitudinal acceleration values is obtained and checked as to whether it exceeds an upper longitudinal acceleration differential threshold value $SWL_{diff}O$. If these three interrogations are answerable in the affirmative, the sensor module 30 is detected as not being installed as assumed, and as having its longitudinal axis 36 installed transversely with respect to the vehicle.

The result of the evaluations in steps 40 and 42 is displayed, if appropriate, in steps 44 and 46. In step 44, a signal is generated for this purpose, which indicates that the installation position corresponds to the assumed installation position. In step 46, an error signal is correspondingly generated, which indicates that the installation position does not correspond to the assumed installation position.

If the conditions mentioned above in steps 40 and 42 are not met, step 38 is revisited.

If a condition in step 38 is not met, i.e., no accelerated straight-ahead travel is occurring, a check is made as to whether, if appropriate, non-accelerated cornering is occurring. For this purpose, in step 48, a determination is made as to whether the calculated vehicle longitudinal acceleration $L_{wheel}$ is smaller in absolute value than a lower longitudinal acceleration threshold value $SWL_{wheel}U$. In addition, in step 48, a determination is made as to whether the calculated or measured vehicle transverse acceleration $T_{yaw}$ is larger in absolute value than an upper transverse acceleration threshold value $SWT_{yaw}O$. If both checks are answerable in the affirmative, non-accelerated cornering is detected. In this case, the process moves to step 50 and to step 52.

In step 50, a determination is made as to whether the sensor module 30 has been installed in the correct installation position, i.e., as assumed, that is, with its longitudinal axis 36 longitudinally with respect to the vehicle. In step 52, a determination is made as to whether the sensor module 30 has not been installed in the assumed installation position, i.e., has been installed with its longitudinal axis 36 transversely with respect to the vehicle.

In step 48, a check is made as to whether the measured module longitudinal acceleration $L_{sens}$ is smaller in absolute value than a lower longitudinal acceleration threshold value $SWL_{sens}U$. In addition, a determination is made as to whether the measured module transverse acceleration $T_{sens}$ is larger in absolute value than an upper transverse acceleration threshold value $SWT_{sens}O$. Finally, the degree of correspondence between the measured module transverse acceleration $T_{sens}$ and the calculated or measured vehicle transverse acceleration $T_{yaw}$ is obtained by determining whether the difference therebetween is smaller in absolute value than a lower transverse acceleration differential threshold value $SWT_{diff}U$. If this difference is smaller in absolute value than this threshold value, a high degree of correspondence between the two transverse acceleration values is present. If these three interrogations are each answerable in the affirmative, in step 54, a signal is generated to the effect that the installation position of the sensor module 30 corresponds to the assumed installation position.

On the other hand, if one of the interrogations in block 50 is answerable in the negative, step 38 is revisited.

In step 52, a determination is made as to whether the installation position of the sensor module 30 does not correspond to the assumed installation position. For this purpose, a check is made as to whether the measured module longitudinal acceleration $L_{sens}$ is larger in absolute value than an upper longitudinal acceleration threshold value $SWL_{sens}O$. In addition, a determination is made as to whether the measured module transverse acceleration $T_{sens}$ is smaller in absolute value than a lower transverse acceleration threshold value $SWT_{sens}U$.

Finally, a determination is made as to whether the difference between the measured module transverse acceleration $T_{sens}$ and the calculated or measured vehicle transverse acceleration $T_{yaw}$ is larger in absolute value than a lower transverse acceleration differential threshold value $SWT_{diff}U$.

If the above interrogations in step 52 are answerable in the affirmative, the installation position of the sensor module 30 is detected as not corresponding to the assumed installation position, and, in step 56, a signal is generated to the effect that the installation does not correspond to the setpoint prescription.

If in step 52 one of the interrogations is answerable in the negative, step 38 is revisited.

With reference to FIG. 3, it has been explained, by means of steps 44 and 54, that the installation position corresponds to the assumed installation position. However, it is also alternatively possible to detect in these steps that the installation position of the sensor module 30 is such that the longitudinal axis 36 of the sensor module 30 is oriented longitudinally with respect to the vehicle 10.

In a corresponding way, in steps 46 and 56, it is possible to detect that the installation position does not correspond to the assumed installation position. However, it is also alternatively possible in these steps to detect that the installation position of the sensor module 30 is such that its longitudinal axis is not oriented longitudinally but rather transversely with respect to the vehicle. By comparing the specific installation position with a setpoint installation position, which has already been detected, it is possible to generate an error signal. This error signal can advantageously be output as an acoustic, visual and/or haptic warning signal in the driver's cab. The driver can therefore be warned that the vehicle movement dynamics control system could be operating incorrectly. The driver is therefore enabled to switch off the functions of the vehicle movement dynamics control system. However, alternatively or additionally, the error signal can also be used to switch off the functions of the vehicle movement dynamics control system automatically in order thereby to avoid incorrect interventions by the vehicle movement dynamics control system.

This detected information relating to the installation position or orientation of the longitudinal axis 36 of the sensor module 30 can be stored in the sensor module or in the vehicle movement dynamics control system in an initialization mode, for example as soon as the vehicle leaves the production line, for the rest of the vehicle's life. It is therefore possible to use the same type of sensor module both for transversely installed and for longitudinally installed sensor modules without parameterization being necessary. This is advantageous with respect to increasing the numbers of identical sensor modules or vehicle movement dynamics control systems, and therefore with respect to reducing the manufacturing costs.

Accordingly, it should be appreciated that the present invention permits simple detection of the installation position of a sensor module of a vehicle movement dynamics control system, specifically including with regard to whether the sensor module is installed with its longitudinal axis longitudinally or transversely in the vehicle.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for determining the installation position of a sensor module in a vehicle, the sensor module having at least one of a longitudinal acceleration sensor for measuring a module longitudinal acceleration in a direction of a longitudinal axis of the sensor module and a transverse acceleration sensor for measuring a module transverse acceleration transversely with respect to the longitudinal axis of the sensor module, the method comprising comparing at least one of a measured module longitudinal acceleration and a measured module transverse acceleration during vehicle travel against at least one of a calculated vehicle longitudinal acceleration and a calculated vehicle transverse acceleration; obtaining at least one degree of correspondence between (i) the at least one of the measured module longitudinal acceleration and the measured module transverse acceleration and (ii) the at least one of the calculated vehicle longitudinal acceleration and the calculated vehicle transverse acceleration based on the comparing; and determining an installation position of the sensor module based on the at least one degree of correspondence.

2. The method as claimed in claim 1, further comprising determining the longitudinal axis of the sensor module to be oriented transversely with respect to the vehicle when, during non-accelerated cornering of the vehicle, the at least one degree of correspondence between the measured module longitudinal acceleration and the calculated vehicle transverse acceleration exceeds a preselected threshold.

3. The method as claimed in claim 1, further comprising determining the longitudinal axis of the sensor module to be oriented longitudinally with respect to the vehicle when, during non-accelerated cornering of the vehicle, the at least one degree of correspondence between the measured module transverse acceleration and the calculated vehicle transverse acceleration exceeds a preselected threshold.

4. The method as claimed in claim 1, further comprising determining the longitudinal axis of the sensor module to be oriented transversely with respect to the vehicle when, during accelerated straight-ahead travel of the vehicle, the at least one degree of correspondence between the measured module transverse acceleration and the calculated vehicle longitudinal acceleration exceeds a preselected threshold.

5. The method as claimed in claim 1, further comprising determining the longitudinal axis of the sensor module to be oriented longitudinally with respect to the vehicle when, during accelerated straight-ahead travel of the vehicle, the at least one degree of correspondence between the measured module longitudinal acceleration and the calculated vehicle longitudinal acceleration exceeds a preselected threshold.

6. The method as claimed in claim 1, further comprising detecting non-accelerated cornering of the vehicle when an absolute value of the vehicle longitudinal acceleration is one of zero and less than a lower longitudinal acceleration threshold value and the absolute value of the vehicle transverse acceleration is greater than an upper transverse acceleration threshold value.

7. The method as claimed in claim 1, further comprising comparing the installation position of the sensor module with a setpoint installation position, and generating an error signal when there is a discrepancy therebetween.

8. The method as claimed in claim 1, wherein determining the installation position of the sensor module is effected in an initialization mode and the installation position is permanently stored in memory located in the vehicle.

9. The method as claimed in claim 1, further comprising determining the longitudinal axis of the sensor module to be oriented longitudinally with respect to the vehicle when, during non-accelerated cornering of the vehicle, the at least one degree of correspondence between the measured module longitudinal acceleration and the calculated vehicle transverse acceleration is less than a preselected threshold.

10. The method as claimed in claim 1, further comprising determining the longitudinal axis of the sensor module to be oriented transversely with respect to the vehicle when, during non-accelerated cornering of the vehicle, the at least one degree of correspondence between the measured module transverse acceleration and the calculated vehicle transverse acceleration is less than a preselected threshold.

11. The method as claimed in claim 1, further comprising determining the longitudinal axis of the sensor module to be oriented longitudinally with respect to the vehicle when, during accelerated straight-ahead travel of the vehicle, the at least one degree of correspondence between the measured module transverse acceleration and the calculated vehicle longitudinal acceleration is less than a preselected threshold.

12. The method as claimed in claim 1, further comprising determining the longitudinal axis of the sensor module to be oriented transversely with respect to the vehicle when, during accelerated straight-ahead travel of the vehicle, the at least one degree of correspondence between the measured module longitudinal acceleration and the calculated vehicle longitudinal acceleration is less than a preselected threshold.

13. The method as claimed in claim 1, further comprising detecting accelerated straight-ahead travel of the vehicle when an absolute value of the vehicle longitudinal acceleration is greater than an upper longitudinal acceleration threshold value and an absolute value of the vehicle transverse acceleration is one of zero and less than a lower transverse acceleration threshold value.

14. The method as claimed in claim 1, wherein the at least one of the calculated vehicle longitudinal acceleration and the calculated vehicle transverse acceleration is derived based on at least one of wheel speeds detected by rotational speed sensors of the vehicle, position data of a satellite navigation system, and signals generated by a vehicle-mounted radar system.

15. A device for determining the installation position of a sensor module in a vehicle, the sensor module having at least one of a longitudinal acceleration sensor configured to measure a module longitudinal acceleration in a direction of a longitudinal axis of the sensor module and a transverse acceleration sensor configured to measure a module transverse acceleration transversely with respect to the longitudinal axis of the sensor module, the device comprising a comparator configured to compare at least one of a measured module longitudinal acceleration and a measured module transverse acceleration against at least one of a calculated vehicle longitudinal acceleration and a calculated vehicle transverse acceleration, and obtain at least one degree of correspondence between (i) the at least one of the measured module longitudinal acceleration and the measured module transverse acceleration and (ii) the at least one of the calculated vehicle longitudinal acceleration and the calculated vehicle transverse acceleration based on the comparison; and a processor adapted to determine an installation position of the sensor module based on the at least one degree of correspondence.

16. The device as claimed in claim 15, wherein the processor is adapted to determine the longitudinal axis of the sensor module to be oriented transversely with respect to the vehicle when, during non-accelerated cornering of the vehicle, the at least one degree of correspondence between the measured module longitudinal acceleration and the calculated vehicle transverse acceleration exceeds a preselected threshold.

17. The device as claimed in claim 15, wherein the processor is adapted to determine the longitudinal axis of the sensor module to be oriented longitudinally with respect to the vehicle when, during non-accelerated cornering of the vehicle, the at least one degree of correspondence between the measured module transverse acceleration and the calculated vehicle transverse acceleration exceeds a preselected threshold.

18. The device as claimed in claim 15, wherein the processor is adapted to determine the longitudinal axis of the sensor module to be oriented transversely with respect to the vehicle when, during accelerated straight-ahead travel of the vehicle, the at least one degree of correspondence between the measured module transverse acceleration and the calculated vehicle longitudinal acceleration exceeds a predetermined threshold.

19. The device as claimed in claim 15, wherein the processor is adapted to determine the longitudinal axis of the sensor module to be oriented longitudinally with respect to the vehicle when, during accelerated straight-ahead travel of the vehicle, the at least one degree of correspondence between the measured module longitudinal acceleration and the calculated vehicle longitudinal acceleration exceeds a predetermined threshold.

20. The device as claimed in claim 15, wherein the processor is adapted to determine non-accelerated cornering of the vehicle when an absolute value of the vehicle longitudinal acceleration is one of zero and less than a lower longitudinal acceleration threshold value and the absolute value of the vehicle transverse acceleration is greater than an upper transverse acceleration threshold value.

21. The device as claimed in claim 15, wherein the processor is adapted to effect a comparison between the installation position of the sensor module with a setpoint installation position and, when there is a discrepancy therebetween, cause an error signal to be generated.

22. The device as claimed in claim 15, wherein the processor is adapted to determine the installation position of the sensor module in an initialization mode and cause the installation position to be permanently stored in memory in the vehicle.

23. A vehicle, comprising the device as claimed in claim 15.

24. The device as claimed in claim 15, wherein the processor is adapted to determine the longitudinal axis of the sensor module to be oriented longitudinally with respect to the vehicle when, during non-accelerated cornering of the vehicle, the at least one degree of correspondence between the measured module longitudinal acceleration and the calculated vehicle transverse acceleration is less than a preselected threshold.

25. The device as claimed in claim 15, wherein the processor is adapted to determine the longitudinal axis of the sensor module to be oriented transversely with respect to the vehicle when, during non-accelerated cornering of the vehicle, the at least one degree of correspondence between the measured module transverse acceleration and the calculated vehicle transverse acceleration is less than a preselected threshold.

26. The device as claimed in claim 15, wherein the processor is adapted to determine the longitudinal axis of the sensor module to be oriented longitudinally with respect to the vehicle when, during non-accelerated cornering of the vehicle, the at least one degree of correspondence between the measured module transverse acceleration and the calculated vehicle longitudinal acceleration is less than a preselected threshold.

27. The device as claimed in claim 15, wherein the processor is adapted to determine the longitudinal axis of the sensor module to be oriented transversely with respect to the vehicle when, during non-accelerated cornering of the vehicle, the at least one degree of correspondence between the measured module longitudinal acceleration and the calculated vehicle longitudinal acceleration is less than a preselected threshold.

28. The device as claimed in claim 15, wherein the processor is adapted to determine accelerated straight-ahead travel of the vehicle when an absolute value of the vehicle longitudinal acceleration is greater than an upper longitudinal acceleration threshold value and an absolute value of the vehicle transverse acceleration is one of zero and less than a lower transverse acceleration threshold value.

29. The device as claimed in claim 15, wherein the at least one of the calculated vehicle longitudinal acceleration and the calculated vehicle transverse acceleration is derived based on at least one of wheel speeds detected by rotational speed sensors of the vehicle, position data of a satellite navigation system, and signals generated by a vehicle-mounted radar system.

\* \* \* \* \*